US006938928B2

(12) United States Patent
Pfohl et al.

(10) Patent No.: US 6,938,928 B2
(45) Date of Patent: Sep. 6, 2005

(54) INTEGRATED FUEL TANK AND COMPLEMENTARY COUNTERWEIGHT

(75) Inventors: Jesse Lee Pfohl, Peosta, IA (US); Eric Juan Angulo, Dubuque, IA (US); Christopher Michael Ruden, Peosta, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/648,028

(22) Filed: Aug. 26, 2003

(65) Prior Publication Data

US 2005/0046169 A1 Mar. 3, 2005

(51) Int. Cl.[7] .............................................. B65D 88/02
(52) U.S. Cl. ...................................... 280/831; 180/314
(58) Field of Search ................................ 220/562–564; 280/831, 839, 426, 400; 180/314

(56) References Cited

U.S. PATENT DOCUMENTS

| 4,087,101 | A | | 5/1978 | Shimazaki et al. ............. 280/5 |
| 4,149,733 | A | * | 4/1979 | Grooss ........................ 280/834 |
| 4,303,755 | A | * | 12/1981 | Yukuta et al. ................. 521/52 |
| 5,330,031 | A | * | 7/1994 | Hill et al. .................... 180/271 |
| 5,673,940 | A | * | 10/1997 | Gaisford et al. ............. 280/834 |
| 5,701,928 | A | * | 12/1997 | Aoki ........................... 137/312 |
| 6,003,900 | A | | 12/1999 | Hasegawa et al. ........... 280/824 |
| 6,296,027 | B1 | * | 10/2001 | Bender et al. ................ 141/86 |
| 6,357,618 | B1 | * | 3/2002 | Kloess et al. ................ 220/562 |
| 6,568,746 | B2 | * | 5/2003 | Sakyo et al. ............... 296/190.08 |
| 6,637,706 | B2 | * | 10/2003 | Kim et al. ................... 248/154 |
| 2001/0038218 | A1 | * | 11/2001 | Clare et al. ................. 296/37.6 |
| 2003/0015536 | A1 | | 1/2003 | Tekulve et al. ............. 220/562 |

FOREIGN PATENT DOCUMENTS

| EP | 0 860 315 A2 | | 2/1998 | |
| JP | 5--330458 | * | 12/1993 | ........... B62D/49/00 |
| JP | 2000-120439 | * | 4/2000 | ............ F01P/11/10 |

* cited by examiner

Primary Examiner—Avraham Lerner (57) ABSTRACT

A fuel system for a work vehicle having fewer points of leakage and a secure or virtually damage proof location for the filler tube of the fuel tank is provided. The fuel system includes an integrated fuel tank which includes a fuel tank and a filler tube integrated as one piece and a counterweight having a complementary portion with a hole of sufficient size to allow passage of the filler tube. The integrated tank and the counterweight are arranged to allow the filler tube to pass through and be surrounded by the complementary portion. The complementary portion may also have a door providing additional protection to the filler tube and a secure and stable stepping area for the operator of the work vehicle.

22 Claims, 10 Drawing Sheets

INTEGRATED FUEL TANK AND COMPLEMENTARY COUNTERWEIGHT

FIELD OF THE INVENTION

The invention relates to configurations for fuel tanks and fuel tank locations in work vehicles such as, for example, loaders. More specifically, it relates to a structure, system and method of increasing the reliability and convenience of fuel systems in work vehicles by reducing the number of parts in the fuel systems and protecting as well as conveniently locating fuel filler tubes and fuel tanks.

BACKGROUND OF THE INVENTION

On many work vehicles such as, for example, loaders, conventional fuel systems include fuel tanks and sundry assortments of associated parts such as filler hoses, filler necks, housings and assorted clamps, o-rings, screws, nuts and bolts for connecting the fuel tank with the associated parts.

SUMMARY OF THE INVENTION

The inventors recognize that conventional fuel systems for work vehicles allow fuel tanks to be conveniently and securely located on a work vehicle but significantly increase the risk for leakage with respect to the associated parts due to a relatively large number of connections. They also understand that, frequently, conventional filler tubes are conveniently, but not securely, located in areas that do not minimize the risk of exposure to damage.

The inventors have solved the above problems by providing a fuel system comprising an integrated fuel tank which includes a fuel tank and a filler tube in a single piece, and a counterweight having a complementary portion that surrounds and protects the filler tube on assembly of the fuel system. This fuel system affords a convenient and secure location for the entire integrated fuel tank, eliminates all connections between the filler tube and the fuel tank and, serendipitously, provides additional counterweight leverage for the work vehicle.

BRIEF DESCRIPTION OF THE DRAWINGS

Embodiments of the invention will be described in detail, with references to the following figures, wherein.

DETAILED DESCRIPTION

Figure 1:
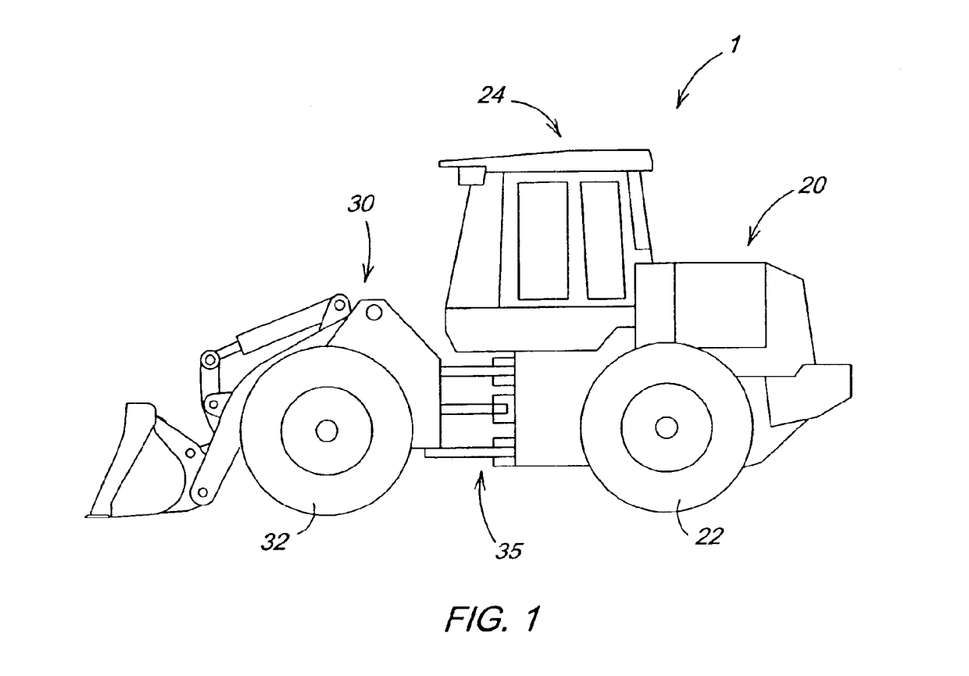
FIG. 1 is a view of a work vehicle in which the invention may be used.

FIG. 1 illustrates a work vehicle 1 in which the invention may be used. The particular work vehicle illustrated in FIG. 1 is an articulated four wheel drive loader having a body 10 that includes a rear body portion 20 pivotally connected to a front body portion 30 by vertical pivots 35, the loader being steered by pivoting of the front body portion 20 relative to the rear body portion 30 in a manner well known in the art. The rear and front body portions 20 and 30 are respectively supported on rear drive wheels 22 and front drive wheels 32. An operator's station 24 is provided on the rear body portion 20 and is generally located above the vertical pivots 35. The rear and front drive wheels 22 and 32 propel the vehicle along the ground and are powered in a manner well known in the art.

Figure 2:
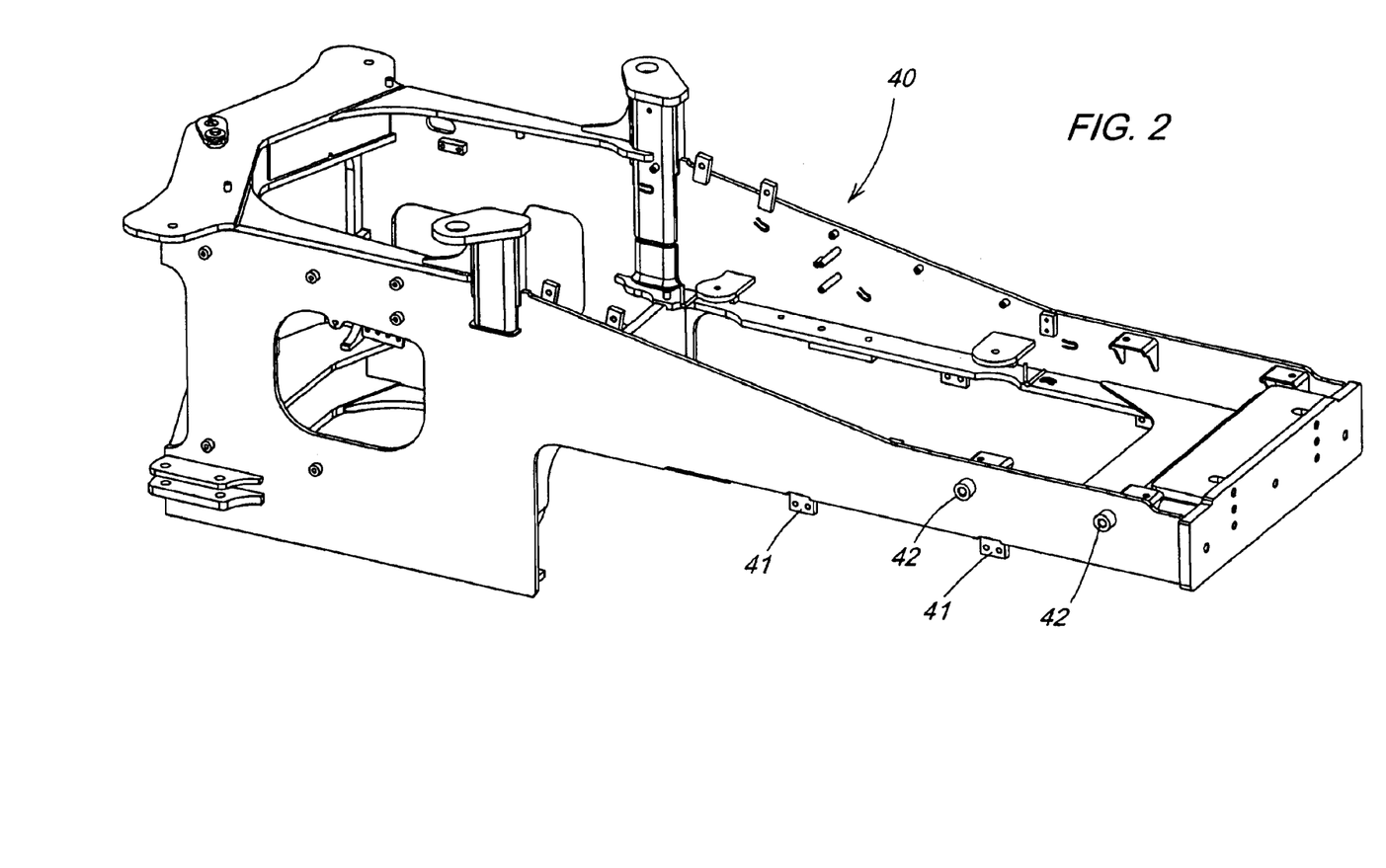
FIG. 2 is a view of a frame for a rear portion of the work vehicle of FIG. 1 to which the invention may be attached.
Figure 3:
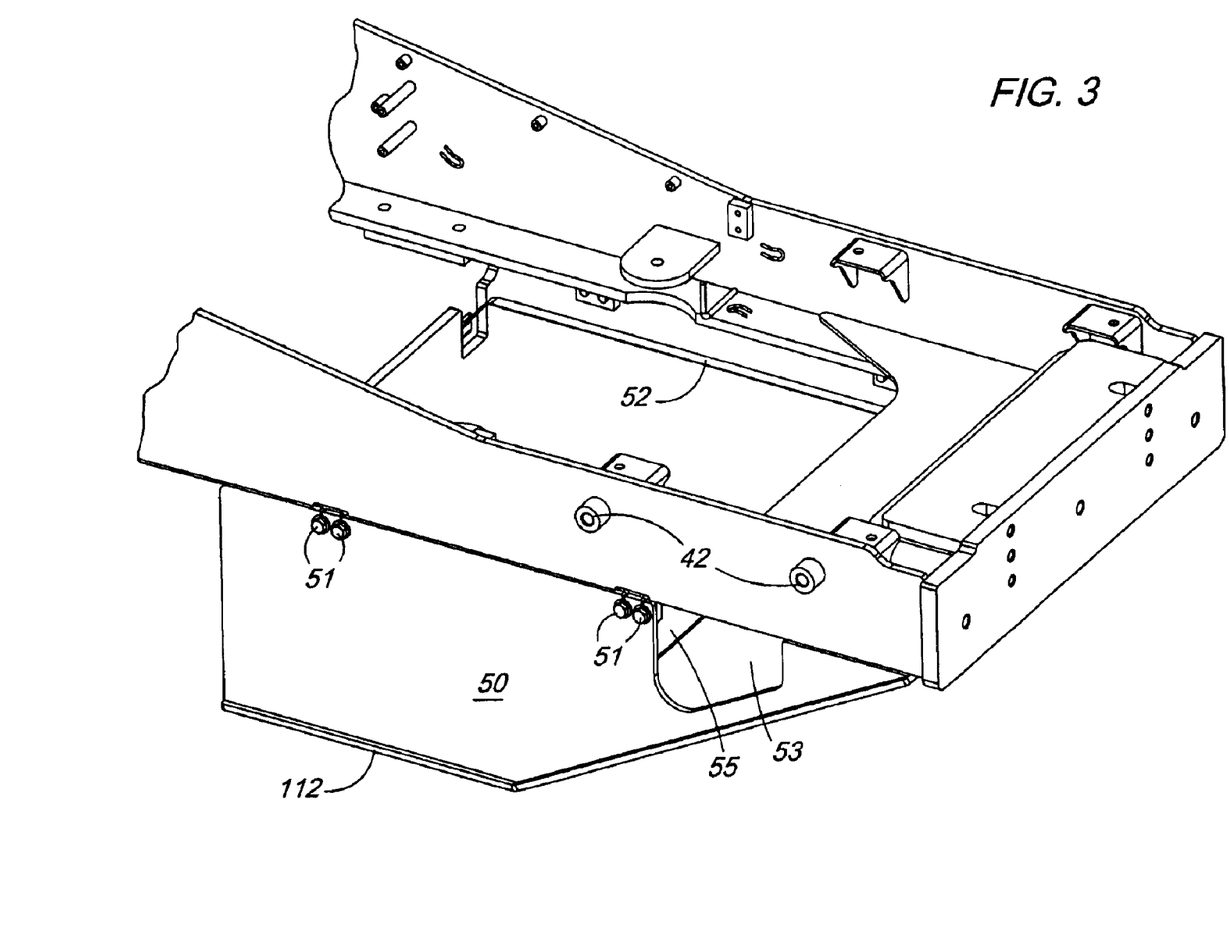
FIG. 3 is a view of the frame of FIG. 2 with an exemplary embodiment of the cradle attached.

FIG. 2 illustrates a rear frame 40 for the articulated loader 1 of FIG. 1. Mounted on the rear frame 40 at mounting tabs 41 via screws 51 is a cradle 50 for shielding and positioning an integrated fuel tank 100. Mounted to the cradle 50 via hold down straps 52 is the integrated fuel tank 100. As is apparent from FIGS. 3, 4 and 5, the integrated fuel tank 100 and the cradle 50 compliment each other as the inner contours of the cradle 50 conform to the outer contours of the lower portions 111, 112, 113, 114 of the integrated fuel tank 100. Additionally, as illustrated in FIG. 5, the cradle 50 has a cutaway or opening 53 which, upon assembly of the fuel system, allows the filler tube 102 to pass through the cradle 50 and into a counterweight 200.

Figure 4:
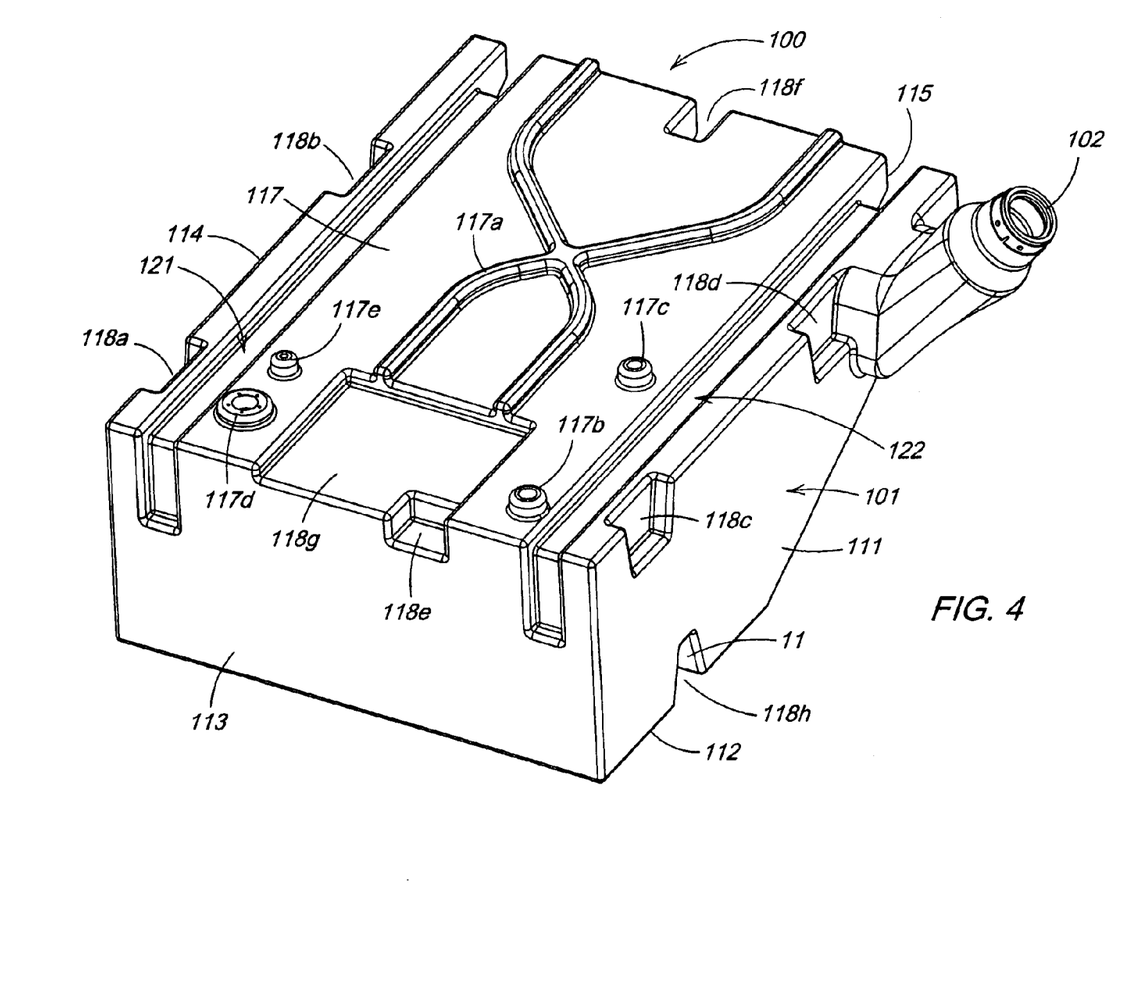
FIG. 4 is a view of an exemplary embodiment of the integrated fuel tank.
Figure 5:
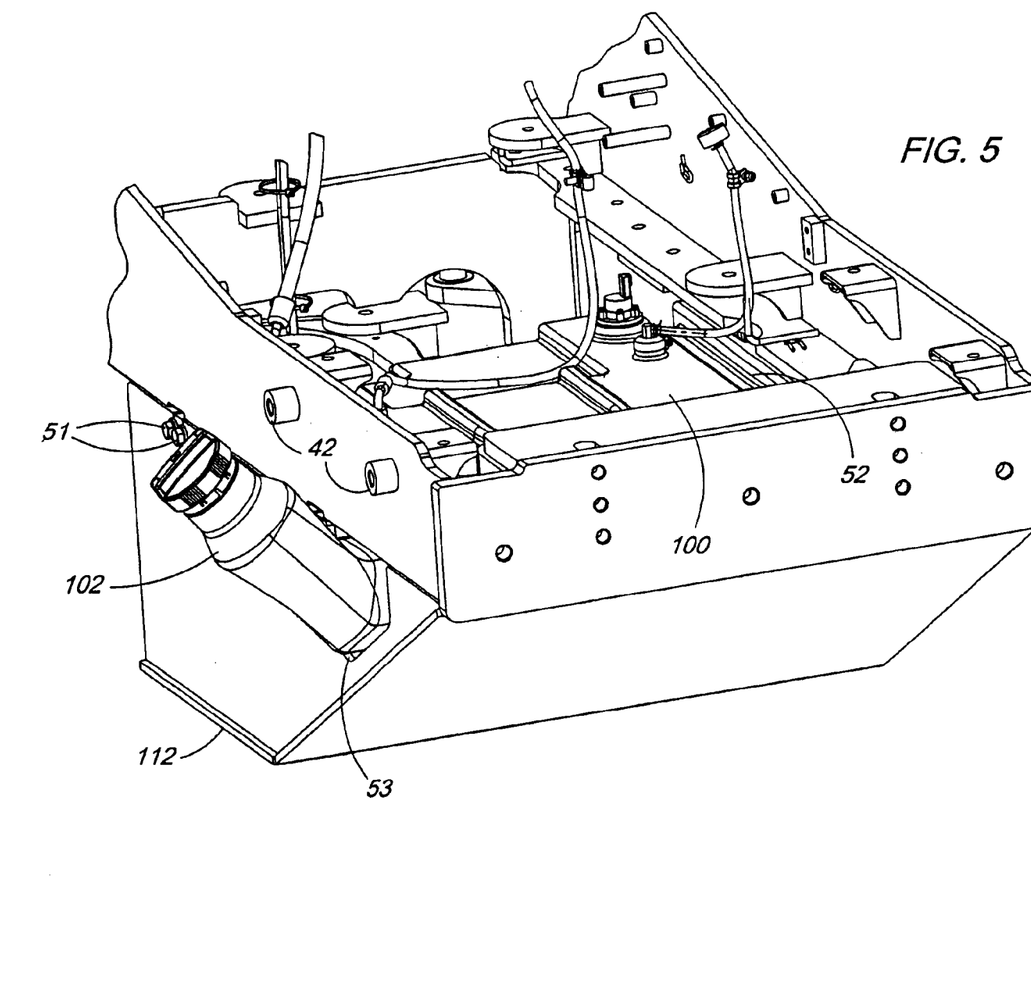
FIG. 5 is a view of the frame in FIG. 3 with the integrated fuel tank of FIG. 4 mounted to the cradle of FIG. 3.
Figure 10:
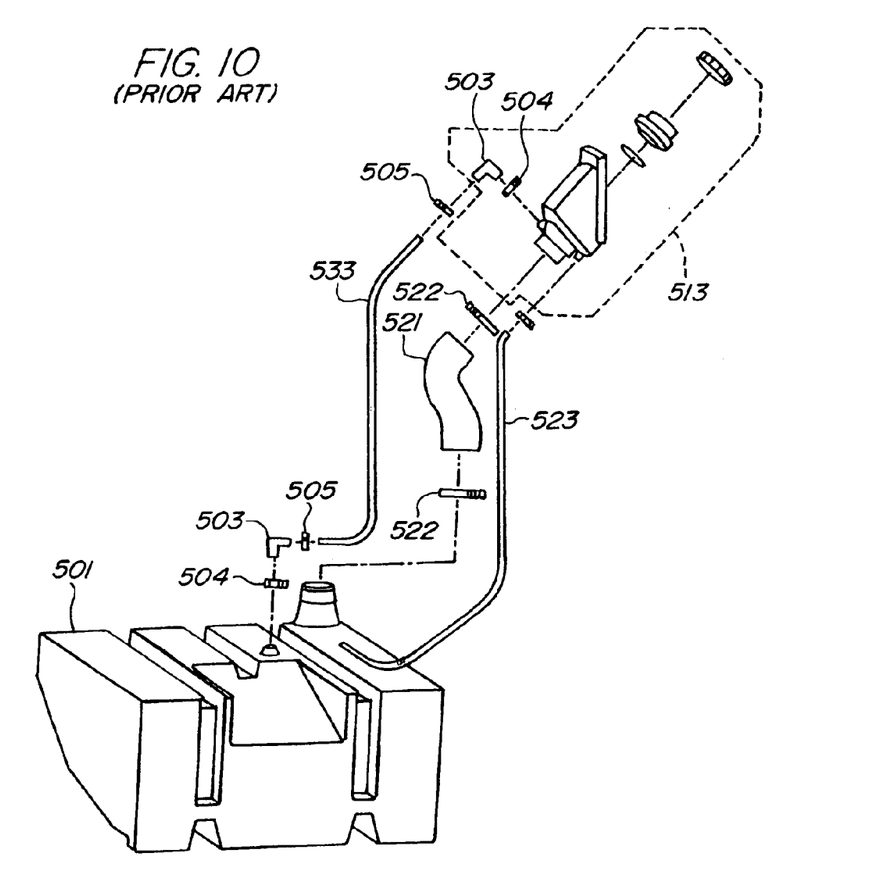
FIG. 10 is a view of a conventional, or prior art, fuel tank and filler tube.

The integrated fuel tank 100, illustrated in FIG. 4, includes a fuel tank 101 and a filler tube 102 combined as a single piece which may be molded plastic. Across the length of a top portion 117 of the integrated fuel tank 100 are hold down grooves 121 and 122 for securing the positions of the hold down straps 52. Also, across the top portion 117 is a raised area 117a for structural reinforcement of the integrated fuel tank as well as a fuel pick-up 117b, a fuel return 117c, a fuel level sensor interface 117d, and a breather or check valve 117e. Finally included on the surface of the fuel tank are relief areas 118a, 118b, 118c, 118d, 118e, 118f and 118g for clearance from various proximal portions of the vehicle 1, including the cradle 50. The single piece construction significantly reduces the potential for leaks when compared to the conventional fuel tank 501; the assortment of hoses 521, 523, 533; the fittings 503; the clamps 504, 505, 522; and the various parts to the housing 513 depicted in FIG. 10.

Figure 6:
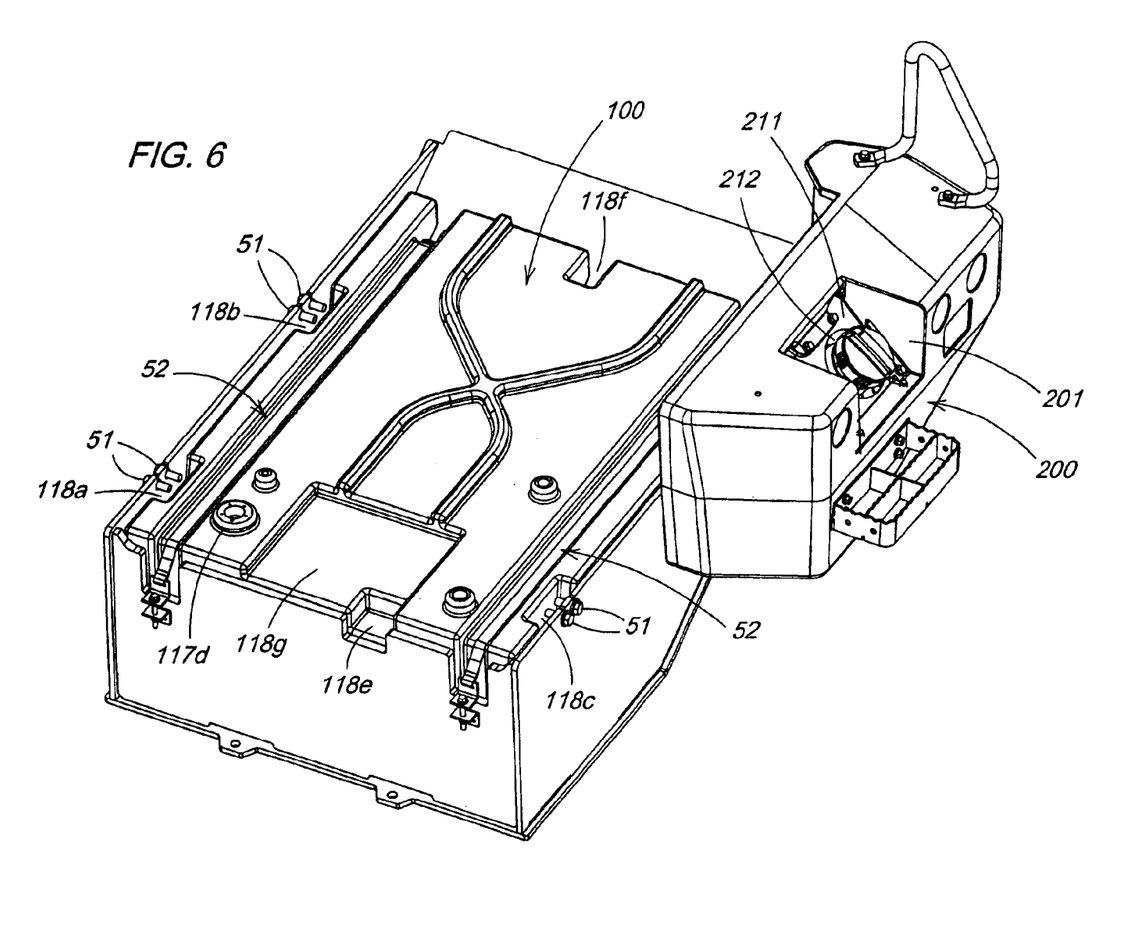
FIG. 6 is a view of the cradle and integrated fuel tank of FIG. 5 with an exemplary embodiment of a counterweight having a complementary portion that allows the passage of a filler tube.

FIG. 6 illustrates an integrated fuel tank 100 mounted to a cradle 50 with its filler tube 102 passing through a hole, i.e., an open area 212 of a complementary counterweight 200. It depicts the counterweight 200 with a door removed for illustrative purposes.

Figure 7:
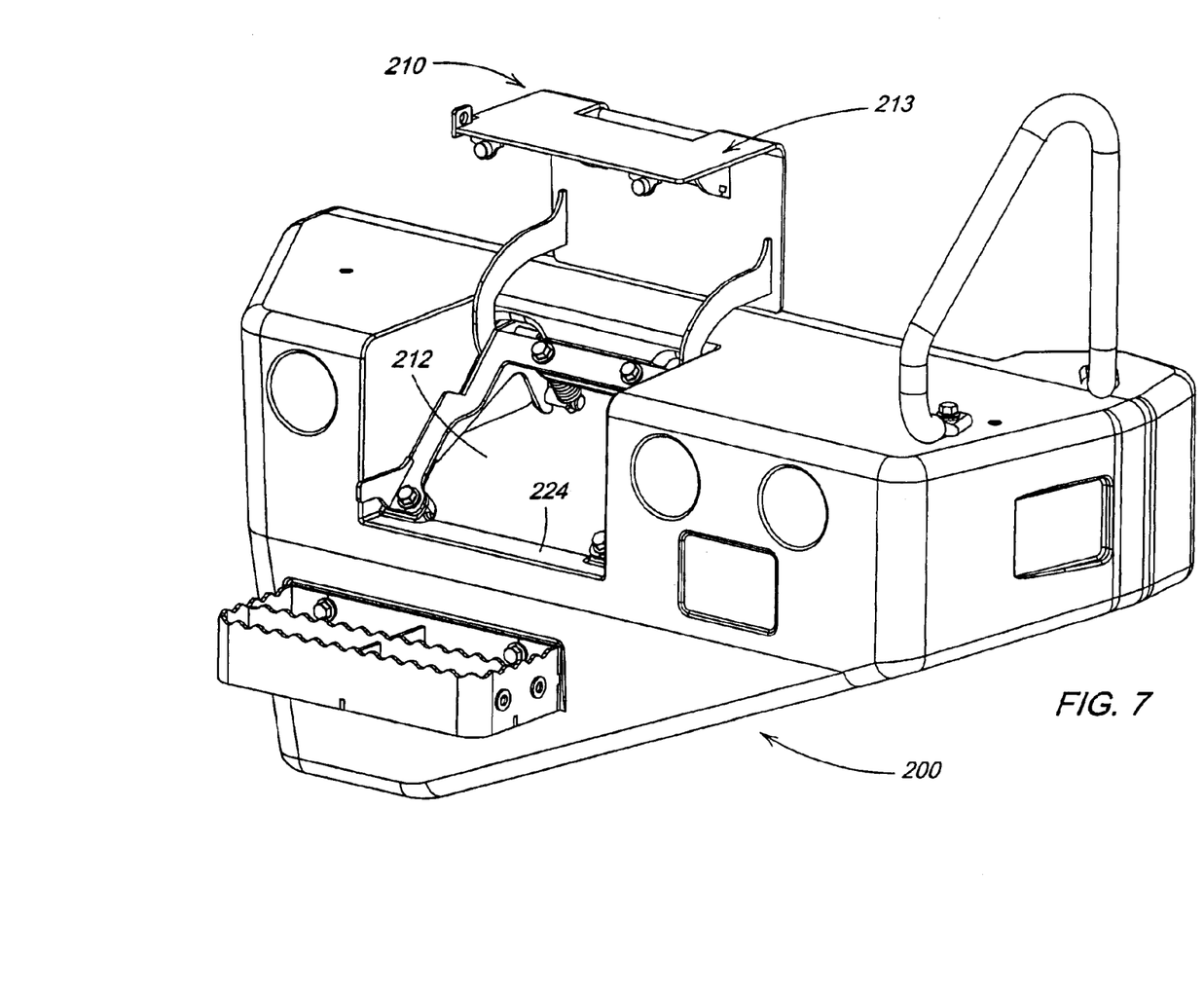
FIG. 7 is a view of the counterweight of FIG. 6 a hinged door in addition to the complementary portion allowing passage of the filler tube.

FIG. 7 depicts the counterweight 200 with a plate-door mechanism 210 having the plate 211 forming the open area 212 and a spring loaded hinged door 213. The plate 211 is attached to the remainder of the counterweight by bolts 220. The hinged door 213 allows the operator to safely step onto the counterweight 200 without damaging the filler tube 102 and without being placed in an awkward or unstable footing position.

Figure 8:
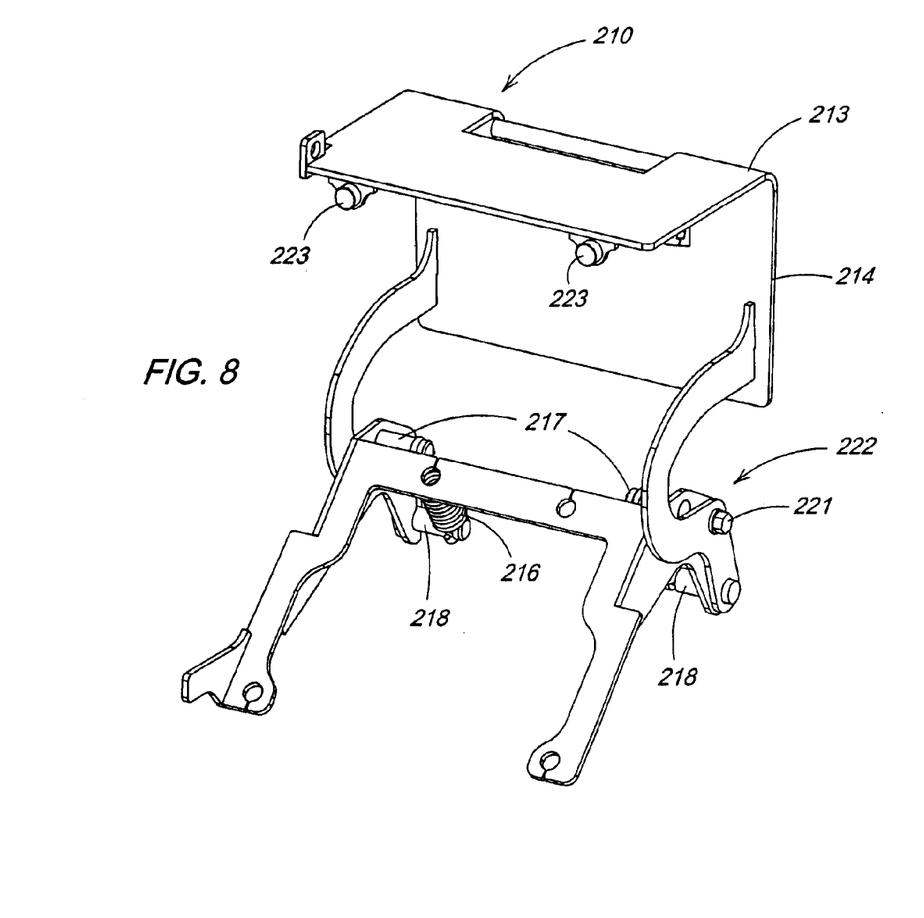
FIG. 8 is a view of an exemplary embodiment of the plate and hinged door illustrated in FIG. 7.

FIG. 8 further details the plate-door mechanism illustrated in FIG. 7. The hinged door 213 is rotationally attached to the plate 211 via door pivots 221. Adjustable door stops 223 determine when the door contacts surface 224 and, thus, adjust the height of surface 214 of the hinged door 213. The springs 216 are attached to the plate 211 at anchor pins 217 and to door arms 219 at anchor pins 218.

In operation, the springs 216 are always in tension and move from a low tension position through a high tension position to a second low tension position. Each of the low tension positions is a position at which the hinged door 213 is either completely open or completely closed. Thus, the springs acts to toggle the door to the completely opened and completely closed positions as the position(s) of the hinged door 213 resulting in the highest tension is a transitional position between completely opened and completely closed.

Figure 9:
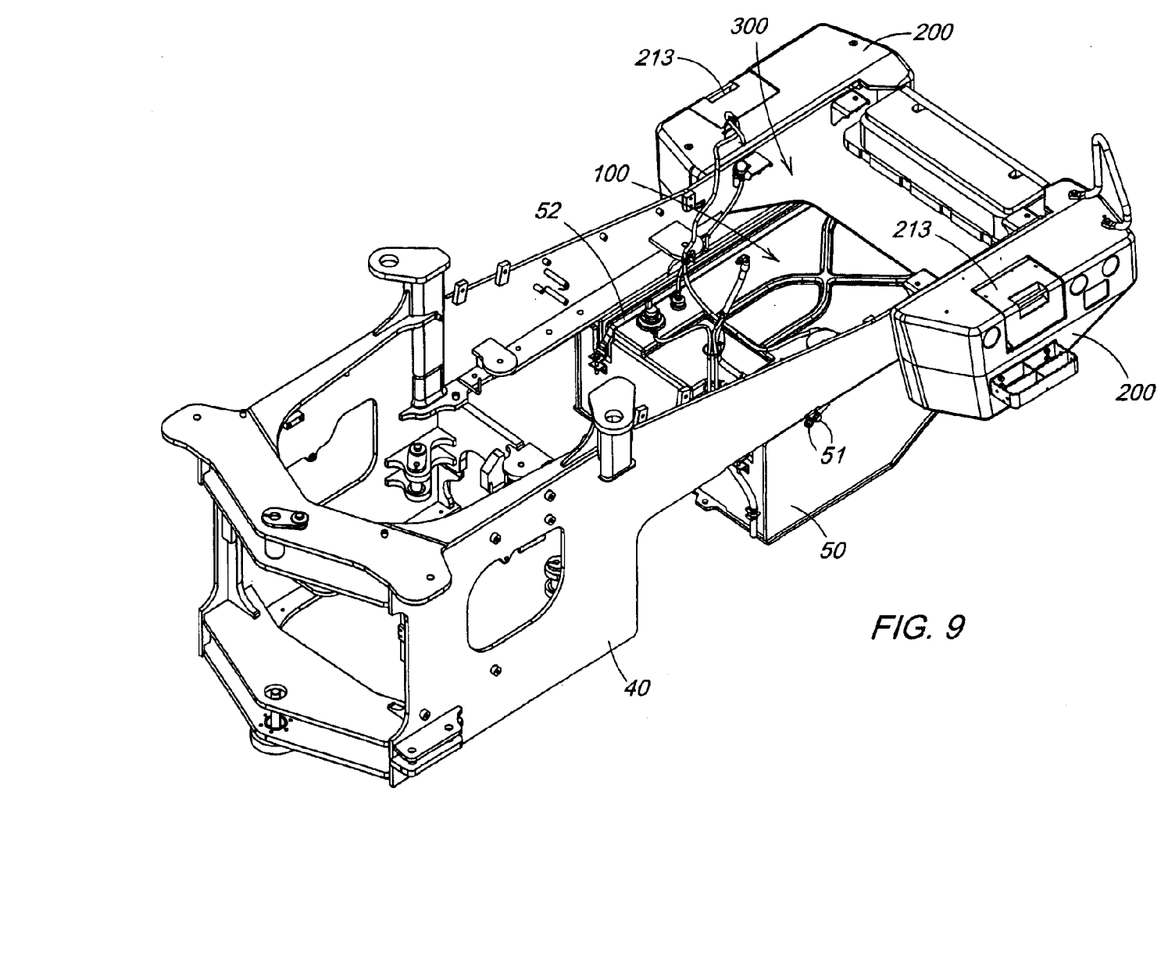
FIG. 9 is a view of the frame of FIG. 2 with a completely assembled fuel system.

FIG. 9 depicts the entire assembled fuel system 300 which includes the integrated fuel tank 100, the cradle 50, the hold down straps 52, and the counterweights 200.

In practice, the fuel system 300 is assembled by: (1) mounting the integrated fuel tank 100 to the cradle 50 by placing it into the cradle 50 such that the filler tube 102 protrudes through the cutaway 53; (2) strapping the integrated fuel tank to the cradle 50 by attaching and tightening the hold down straps 52; (3) attaching the cradle 50 to the mounting tabs 21 via the screws 51; (4) positioning the counterweight 200 to allow the filler tube 102 to protrude through an open area 201 of the counterweight 200; and (5) attaching the counterweight to the frame via screws 202 and the threaded attachment bosses 42. The plate 203 and hinged door 204 are then assembled to the counterweight 200 via screws.

Having described the illustrated embodiment, it will become apparent that various modifications can be made without departing from the scope of the invention as defined in the accompanying claims.

What is claimed is:

1. A fuel system for a work vehicle comprising:
   an integrated fuel tank, the integrated fuel tank including a fuel tank and a filler tube, the fuel tank and the filler tube being one piece; and
   a counterweight having a complementary portion, the complementary portion comprising a step capable of supporting an operator and a hole of sufficient size to allow passage of the filler tube, the hole being located in the step, the integrated tank and the counterweight being arranged to allow the filler tube to pass through and be surrounded by the complementary portion.

2. The fuel system of claim 1, further comprising a cradle, the cradle supporting and surrounding lower portions of the integrated fuel tank.

3. The fuel system of claim 2, further comprising a vehicle frame wherein the cradle is attached to the vehicle frame.

4. The fuel system of claim 3, wherein the cradle holds the integrated fuel tank in place.

5. The fuel system of claim 4, wherein the cradle is made of metal.

6. The fuel system of claim 1, further comprising a hinged door, the hinged door forming a part of the complementary portion of the counterweight.

7. The fuel system of claim 6, wherein the hinged door has a shape that conforms to a shape of adjacent portions of the counterweight when the hinged door is in a closed position.

8. The fuel system of claim 6, wherein the hinged door has a first and a second position, the hinged door covering the filler tube in the first position, the hinged door uncovering the filler tube in e second position.

9. The fuel system of claim 1, wherein the integrated fuel tank comprises molded plastic.

10. A fuel system for a work vehicle comprising:
    an integrated fuel tank, the integrated fuel tank including a fuel tank and a filler tube, the fuel tank and the filler tube integrated as one piece; and
    a counterweight having a complementary portion, the complementary portion comprising a hole of sufficient size to allow passage of the filler tube, the integrated tank and counterweight being arranged to allow the filler tube to pass through and be surrounded by the complementary portion;
    a cradle, the cradle supporting and surrounding lower portions of the integrated fuel tank; and
    a vehicle frame wherein the cradle is attached to the vehicle frame and wherein a top portion of the integrated fuel tank includes a hold down groove.

11. The fuel system of claim 10, further comprising a hold down strap, the hold down strap attached to at least one of the frame and the cradle, the hold down strap cooperating with the hold down groove to keep the lower portions of the integrated fuel tank supported and surrounded by the cradle.

12. A work vehicle comprising:
    a vehicle frame;
    ground engaging wheels;
    an integrated fuel tank, the integrated fuel tank including a fuel tank and a filler tube, the fuel tank and the filler tube being one piece; and
    a counterweight having a complementary portion, the complementary portion comprising a step capable of supporting an operator and a hole of sufficient size to allow passage of the filler tube, the hole being located in the step. the integrated fuel tank and the counterweight being arranged to allow the filler tube to pass through and be surrounded by the complementary portion.

13. The work vehicle of claim 12, further comprising a cradle, the cradle Supporting and surrounding lower portions of the integrated fuel tank.

14. The work vehicle of claim 13, wherein the cradle is attached to the vehicle frame.

15. The work vehicle of claim 14, wherein the cradle holds the integrated fuel tank in place.

16. The work vehicle of claim 15, wherein the cradle is made of metal.

17. The work vehicle of claim 12, further comprising a hinged door, the hinged door forming a part of the complementary portion of the counterweight.

18. The work vehicle of claim 17, wherein the hinged door has a shape that conforms to a shape of adjacent portions of the counterweight when the hinged door is in a closed position.

19. The work vehicle of claim 17, wherein the hinged door has a first and a second position, the hinged door covering the filler tube in the first position, the hinged door uncovering the filler tube in the second position.

20. The work vehicle of claim 12, wherein the integrated fuel tank comprises molded plastic.

21. A work vehicle comprising:
    a vehicle frame;
    ground engaging wheels;
    an integrated fuel tank, the integrated fuel tank including a fuel tank and a filler tube, the fuel tank and the filler tube integrated as one piece; and
    a counterweight having a complementary portion, the complementary portion comprising a hole of sufficient size to allow passage of the filler tube, the integrated fuel tank and counterweight being arranged to allow the filler tube to pass through and be surrounded by the complementary portion;
    a cradle, the cradle supporting and surrounding lower portions of the integrated fuel tank, wherein the cradle is attached to the vehicle frame and wherein a top portion of the integrated fuel tank includes a hold down groove.

22. The work vehicle of claim 21, further comprising a hold down strap, the hold down strap attached to at least one of the frame and the cradle, the hold down strap cooperating with the hold down groove to keep the lower portions of the integrated fuel tank supported and surrounded by the cradle.

* * * * *